United States Patent
Xia

(10) Patent No.: US 8,370,503 B2
(45) Date of Patent: Feb. 5, 2013

(54) AUTHENTICATION OPTION SUPPORT FOR BINDING REVOCATION IN MOBILE INTERNET PROTOCOL VERSION 6

(75) Inventor: Yangsong Xia, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 317 days.

(21) Appl. No.: 12/397,163

(22) Filed: Mar. 3, 2009

(65) Prior Publication Data

US 2009/0276533 A1 Nov. 5, 2009

Related U.S. Application Data

(60) Provisional application No. 61/049,906, filed on May 2, 2008.

(51) Int. Cl.
*G06F 15/16* (2006.01)

(52) U.S. Cl. ........ 709/228; 713/169; 713/170; 713/171; 713/172; 713/173; 455/410

(58) Field of Classification Search .................. 709/228; 713/169–173; 455/410
See application file for complete search history.

(56) References Cited

U.S. PATENT DOCUMENTS

| | | | |
|---|---|---|---|
| 7,496,057 B2 * | 2/2009 | Patel et al. ..................... 370/310 |
| 2005/0079869 A1 * | 4/2005 | Khalil et al. ................ 455/435.1 |
| 2005/0232429 A1 * | 10/2005 | Chowdhury et al. ......... 380/277 |
| 2007/0037553 A1 * | 2/2007 | Patel et al. ..................... 455/410 |
| 2007/0124592 A1 * | 5/2007 | Oyama ......................... 713/171 |
| 2007/0136590 A1 * | 6/2007 | Nah et al. ...................... 713/171 |
| 2008/0043758 A1 * | 2/2008 | Giaretta et al. ............... 370/400 |
| 2009/0122985 A1 * | 5/2009 | Khalid et al. ................. 380/255 |
| 2010/0030863 A1 * | 2/2010 | Qin ............................... 709/206 |
| 2010/0106969 A1 * | 4/2010 | Muhanna et al. ............. 713/168 |
| 2010/0161986 A1 * | 6/2010 | Bucker et al. ................. 713/169 |
| 2010/0275020 A1 * | 10/2010 | Aramaki et al. .............. 713/170 |
| 2010/0313024 A1 * | 12/2010 | Weniger et al. ............... 713/170 |

FOREIGN PATENT DOCUMENTS

| | | |
|---|---|---|
| CN | 1564626 A | 1/2005 |
| CN | 1602107 A | 3/2005 |
| WO | 2007090774 A1 | 8/2007 |

OTHER PUBLICATIONS

Bradner, S., "Key Words for Use in RFCs to Indicate Requirement Levels," Network Working Group, RFC 2119, Mar. 1997, 3 pages.
Gundavelli, S., et al., "Proxy Mobile IPv6," Network Working Group, RFC 5213, Aug. 2008, 8 pages.
Johnson, D., et al., "Mobility Support in IPv6," Network Working Group, RFC 3775, Jun. 2004, 155 pages.
Patel, A., et al., "Authentication Protocol for Mobile IPv6," Network Working Group, RFC 4285, Jan. 2006, 20 pages.

(Continued)

*Primary Examiner* — Duyen Doan
(74) *Attorney, Agent, or Firm* — Conley Rose, P.C.; Grant Rodolph; Clint Wilkins

(57) ABSTRACT

A network component comprising at least one processor configured to implement a method comprising sending a message comprising an authentication mobility option to a mobile node, wherein the message is configured to revoke a mobility binding for the mobile node is disclosed. Also disclosed is a system comprising a home agent configured to send a binding revocation indication (BRI) to a mobile node and receive a binding revocation acknowledgement (BRA) from the mobile node, wherein the BRI comprises a first authentication mobility option and the BRA comprises a second authentication mobility option. Included is a method comprising receiving a BRI message comprising an authentication mobility option from a home agent, analyzing the authentication mobility option, and sending a BRA message to the home agent.

22 Claims, 2 Drawing Sheets

OTHER PUBLICATIONS

Patel, A., et al., "Mobile Node Identifier Option for Mobile IPv6," Network Working Group, RFC 4283, Nov. 2005, 9 pages.

Haley, Brian, et al., "Generic Notification Message for Mobile IPv6," MIP6 Working Group, Internet Draft, draft-ietf-mip6-generic-notification-message-00.txt, Oct. 2007, 10 pages.

Muhanna, A., et al., "Binding Revocation for IPv6 Mobility," Network Working Group, Internet Draft, draft-ietf-mext-binding-revocation-01.txt, Aug. 28, 2008, 34 pages.

Muhanna, A., et al., "Binding Revocation for IPv6 Mobility," MIP6 Working Group, Internet Draft, draft-muhanna-mip6-binding-revocation-02.txt, Nov. 19, 2007, 23 pages.

Patel, A., et al., "Authentication Protocol for Mobile IPv6," Network Working Group, Internet Draft, draft-ietf-mip6-rfc4285bis-02.txt, Dec. 4, 2007, 25 pages.

Patil, Basavaraj, et al., "Why Authentication Data Suboption is Needed for MIP6," MIP6 Working Group, Internet Draft, draft-ietf-mip6-whyauthdataoption-05.txt, Feb. 25, 2008, 16 pages.

Soliman, H., et al., "Mobile IPv6 Support for Dual Stack Hosts and Routers," Network Working Group, Internet Draft, draft-ietf-mext-nemo-vtraversal-04.txt, Jun. 10, 2008, 48 pages.

Wakikawa, R., et al., "Multiple Care-of Addresses Registration," MEXT Working Group, Internet Draft, draft-ietf-monami6-multiplecoa-06.txt, Feb. 24, 2008, 43 pages.

Wakikawa, R., et al., "Multiple Care-of Addresses Registration," MEXT Working Group, Internet Draft, draft-ietf-monami6-multiplecoa-08.txt, May 30, 2008, 44 pages.

Foreign Communication From a Related Counterpart Application—International Search Report and Written Opinion, PCT/CN2009/071587, Aug. 6, 2009, 9 pages.

Muhanna, A., et al., "Binding Revocation for IPv6 Mobility," draft-muhanna-mext-binding-revocation-00.txt, Apr. 29, 2008, 33 pages.

Muhanna, A., et al., "Binding Revocation for IPv6 Mobility," draft-ietf-mext-binding-revocation-03.txt, Jan. 29, 2009, 36 pages.

Patel, A., et al., "Authentication Protocol for Mobile IPv6," draft-ietf-mip6-rfc4285bis-02.txt, Dec. 4, 2007, 25 pages.

Patel, A., et al., "Authentication Protocol for Mobile IPv6," draft-ietf-mip6-rfc4285bis-03.txt, Jul. 14, 2008, 25 pages.

Soliman, H., Ed., "Mobile IPv6 Support for Dual Stack Hosts and Routers," draft-ietf-mext-nemo-v4travesrsal-02.txt, Apr. 29, 2008, 49 pages.

Soliman, H., Ed., "Mobile IPv6 Support for Dual Stack Hosts and Routers," draft-ietf-mext-nemo-v4travesral-09.txt, Feb. 27, 2009, 48 pages.

Wakikawa, R., Ed., et al., "Multiple Care-of Addresses Registration," draft-ietf-monami6-multiplecoa-07.txt, Apr. 30, 2008, 45 pages.

Wakikawa, R., Ed., et al., "Multiple Care-of Addresses Registration," draft-ietf-monami6-multiplecoa-11.txt, Jan. 13, 2009, 45 pages.

Patil, B., et al., "Why the Authentication Data Suboption is Needed for Mobile IPv6 (MIPv6)," RFC 5419, Jan. 2009, 20 pages.

* cited by examiner

AUTHENTICATION OPTION SUPPORT FOR BINDING REVOCATION IN MOBILE INTERNET PROTOCOL VERSION 6

CROSS-REFERENCE TO RELATED APPLICATIONS

This application claims priority to U.S. Provisional Application Ser. No. 61/049,906 filed May 2, 2008 by Xia et al. and entitled "Authentication Option Support for MIPv6 Extension," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In modern wireless access networks, mobile nodes (MNs) allow users to freely move between access points without the user having to configure the MN for each access point. Specifically, the MN's communication with each access point may be coordinated using a home agent (HA). In Internet Protocol (IP) version 6 (IPv6) networks, a binding update message exchange allows the MN to bind its mobility session to the HA, and a binding revocation message exchange allows the HA to revoke the mobility binding, thereby freeing the MN to bind to another HA. In some instances, the binding and binding revocation messages may need to be secured. For example, the binding and binding revocation messages may be secured using IP Security (IPSec). However, IPSec can be a cumbersome process and cannot be used in all instances.

SUMMARY

In a first embodiment, the disclosure includes a network component comprising at least one processor configured to implement a method comprising sending a message comprising an authentication mobility option to a mobile node, wherein the message is configured to revoke a mobility binding for the mobile node.

In a second embodiment, the disclosure includes a system comprising a HA configured to send a binding revocation indication (BRI) to a mobile node and receive a binding revocation acknowledgement (BRA) from the mobile node, wherein the BRI comprises a first authentication mobility option and the BRA comprises a second authentication mobility option.

In a third embodiment, the disclosure includes a method comprising receiving a BRI message comprising an authentication mobility option from a HA, analyzing the authentication mobility option, and sending a BRA message to the HA.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and system for including authentication data in mobility binding revocation messages between a HA and a MN. Specifically, authentication data may be created using a security association (SA) between the MN and the HA, and the authentication data may be included in a BRI message and a BRA message, for example as an Authentication Mobility Option appended to the messages. The authentication data prevents revocation of the MN's mobility binding by unauthorized third parties.

Figure 1:
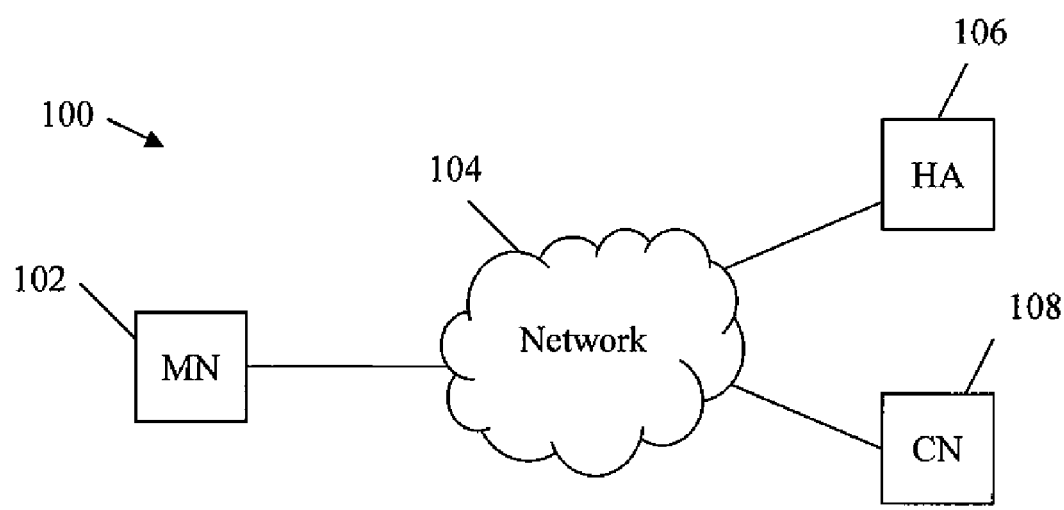
FIG. 1 is a schematic diagram of an embodiment of a wireless system showing the operation of Mobile IPv6.

FIG. 1 illustrates an embodiment of a wireless system 100. The system 100 may comprise a MN 102, a network 104, a HA 106, and a correspondent node (CN) 108, all of which are in communication with each other as shown in FIG. 1. The system 100 may be an IP system, such as an IP version 4 (IPv4) system, an IPv6 system, or combinations thereof. Alternatively, the system 100 may be any other type of data communications system implementing any other suitable protocol. It will be appreciated that FIG. 1 is only one embodiment of the system 100, and that the system 100 may comprise additional components including additional MNs 102, networks 104, HAs106, CNs 108, or combinations thereof.

The MN 102 may be any device or component that uses the network 104 and/or HA 106 to communicate with the CN 108. Typically, the MN 102 is a mobile user-oriented device that communicates wirelessly with the HA 106 via the network 104 and/or a foreign agent, but the MN 102 should not be limited as such. For example, the MN 102 may be a cellular phone, a notebook computer, a personal digital assistant (PDAs), or any other wireless device.

The network 104 may be any device, component, or network that exchanges data between the MN 102, the HA 106, and/or the CN 108. For example, the network 104 may be a Packet Switched Network (PSN), such as a local area network (LAN), a metropolitan area network (MAN), a wide area network (WAN), an intranet, or the Internet. Alternatively, the network 104 may be a circuit switched network, such as a public switched telephone network (PSTN), or any other network. The network 104 may comprise a plurality of access links that allow the MN 102, the HA 106, and/or the CN 108 to independently couple to the network 104 via wireless or wired, e.g. electrical or optical, means. In some embodiments, the network 104 may comprise or may be part of a base transceiver station (BTS), a base station controller, or the like, and/or may use such to communicate with the MN 102.

The HA 106 may be any device or component that allows the MN 102 to communicate with the CN 108. The HA 106 may communicate with the MNs 102 through the network 104 or may communicate directly with the MN 102. The HA 106 may be a router in that it forwards packets that are not explicitly addressed to the HA 106 to other nodes, e.g. the MN 102 and/or the CN 108. The HA 106 may be responsible for maintaining the MN's 102 reachability state and may be the topological anchor point for the MN's 102 home network prefix. In an embodiment, the HA 106 may act as a dynamic host configuration protocol (DHCP) client and/or an authentication, authorization, and accounting (AAA) client, and may comprise an address cache. In addition, the HA 106 may handle IP routing for the MNs 102 that may roam into a foreign network.

In an embodiment, the CN 108 may be any device, component, or network that exchanges data with the HA 106 and/or MN 102. For example, the CN 108 may be another MN 102, a server, another network, or any other device, component, or network configured to send an/or receive data. Alternatively, the CN 108 may be a component that exchanges data between the system 100 and an external network, such as a wireless router.

The components described above may communicate with each other via fixed and/or wireless links using a variety of technologies. The wireless links may be created dynamically when the MN 102 attaches to the HA 106 directly or through the network 104. The wireless links may be implemented using a multiple access technology, such as Code Division Multiple Access (CDMA), Orthogonal Frequency Division Multiple Access (OFDMA), or Time Division Multiple Access (TDMA). Examples of suitable wireless link technologies include the Internet Engineering Task Force (IETF), Worldwide Interoperability for Microwave Access (WiMAX), Wireless Fidelity (WiFi), Wideband CDMA (WCDMA), Global System for Mobile communications (GSM), Enhanced Data for GSM Evolution (EDGE), Universal Mobile Telecommunication Systems (UMTS), Third Generation Partnership Project (3GPP), Third Generation Partnership Project 2 (3GPP2), Advanced Mobile Phone Service (AMPS), one of the Institute of Electrical and Electronic Engineers (IEEE) 802 wireless networks, such as 802.16d/e, or any other wireless network. The remaining components may be coupled together via fixed links, such as electrical or optical links. Examples of suitable fixed link technologies include IP, Ethernet, Asynchronous Transfer Mode (ATM), Frame Relay, Synchronous Optical Network (SONET), and Synchronous Digital Hierarchy (SDH). The fixed and wireless links may have a fixed bandwidth such that a fixed amount of data is transported over the link, or may have a variable-sized bandwidth.

When the system 100 is a Mobile IPv6 system, the system 100 may implement a binding update (BU) procedure to ensure constant communication between the MN 102 and the HA 106. Before the BU procedure is implemented, the MN 102 and its HA 106 may share a valid, preexisting MN-HA SA. This MN-HA SA may be based on MN-HA Mobility Message Authentication Option described in "Authentication Protocol for Mobile IPv6" by Patel et al, IETF document RFC 4285, January 2006 (RFC 4285), which is incorporated herein by reference. In addition, the MN-HA SA may be used to protect and secure the binding revocation messages between the HA 106 and MN 102 as described below. In the BU procedure, the MN 102 may send a BU message to the HA 106, e.g. when the MN 102 roams into a foreign network. The HA 106 may record the MN's address as a binding cache entry, and send a binding acknowledgment (BA) message back to the MN 102. The MN 102 may then commence communications with the CN 108. Communications from the CN 108 to the MN 102 are routed to the HA 106, and then to the MN 102. Similarly, communications from the MN 102 to the CN 108 are routed to the HA 106, and then to the CN 108. In some cases, route optimization may be used to eliminate this triangular routing pattern. Such routing optimization procedures may comprise a BU procedure between the MN 102 and the CN 108. When the MN 102 changes locations, at least part of the BU procedure may be repeated.

Figure 2:
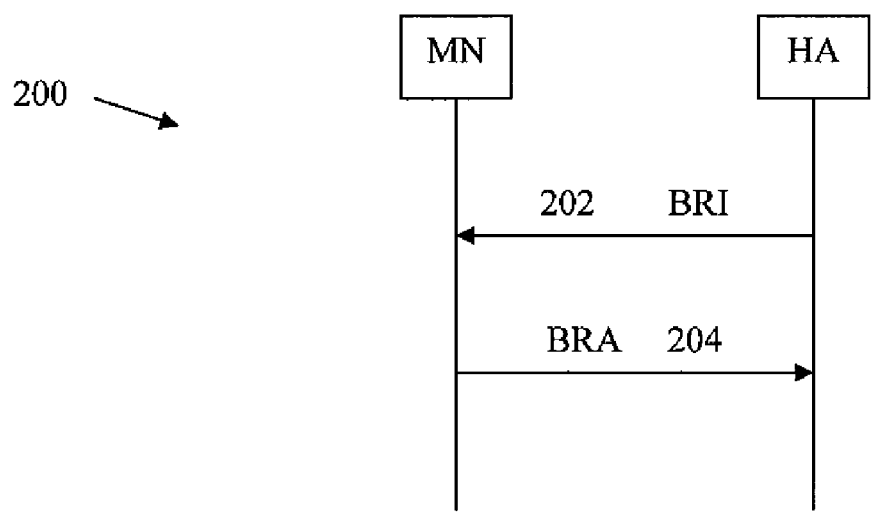
FIG. 2 is a protocol diagram of a binding revocation exchange.

FIG. 2 illustrates an embodiment of a binding revocation exchange 200. The binding revocation exchange may be used to terminate a MN's mobility session, and is defined in detail in "Biding Revocation for IPv6 Mobility" by Muhanna et al., IETF document draft-ietf-mext-binding-revocation-01, August 2008 (Muhanna), incorporated herein by reference. As shown in FIG. 2, the binding revocation exchange 200 may comprise a BRI message 202 and a BRA message 204. Each of these messages is discussed in further detail below.

When the HA desires to revoke the MN's mobility service, e.g. the MN's MIPv6 registration, the HA may send a BRI message 202 to the MN. The BRI message 202 may comprise the contents described in Muhanna, as well as the MN-HA Authentication Mobility Option described below. For example, the BRI message 202 may also comprise an acknowledge (A) bit that when set, causes the MN to send the BRA message 204 back to the HA. The MN's care-of address (CoA) may be used as the Source Address in header of the BRI message 202. The BRI message 202 may also comprise a Mobility Message Replay Protection Option, where the HA may set the timestamp field to its current timestamp. In addition, the BRI message 202 may comprise a home address (HoA) Destination Option that comprises the MN's HoA. Additionally, the BRI message 202 may comprise an Alternative CoA Mobility Option comprising the MN's current CoA. If a Mobile Node Identifier Option was used in the exchange of the Client mobile IPv6 BU and BA signaling, the HA may include it in the BRI message 202. Finally, the HA may construct Authentication Mobility Option described below using the currently active MN-HA SA, and add the Authentication Mobility Option as the last mobility option in the BRI message 202.

When the MN receives the BRI message 202, the MN may validate the authentication data prior to analyzing the remainder of the BRI message 202. Specifically, the MN may use a mobility security parameter index (SPI) and the authentication data in the BRI message 202 to determine whether the BRI message 202 is authentic, e.g. is from the HA. If the authentication data is invalid, the MN may discard the BRI message 202 without analyzing its contents. If the authentication data is valid, the MN may analyze the timestamp in the Mobility Message Replay Protection Option. Specifically, the MN may check the timestamp in the Mobility Message Replay Protection Option to make sure that the BRI message 202 has been sent within the allowed time interval. The MN may then process the BRI message 202, which may include deleting a binding update list identified in the BRI message 202.

After the BRI message 202 has been processed, the MN may send a BRA message 204 to the HA. The BRA message 204 may comprise the contents described in Muhanna, as well as the MN-HA Authentication Mobility Option described below. The BRA message 204 may also indicate whether the authentication data could be successfully verified, for example by adding a "success" or "failure" status code to the BRA message 204. If authentication fails, the BRA message 204 may comprise a special status code that indicates the reason for authentication failure. The BRA message 204 may also comprise a Mobility Message Replay Protection Option, where the MN may set the timestamp field to its current timestamp. In addition, the BRA message 204 may comprise a HoA Destination Option that comprises the MN's HoA. Additionally, the BRA message 204 may comprise an Alternative CoA Mobility Option comprising the MN's current CoA. If the HoA Destination Option and/or the Alternate CoA Option were not included in the BRI message, the MN may include a status code indicating "Session Unknown" in the BRA message 204.

When the HA receives the BRA message 204, the HA may validate the authentication data prior to analyzing the remainder of the BRA message 204. Specifically, the HA may use a mobility SPI and the authentication data in the BRA message 204 to determine whether the BRA message 204 is authentic, e.g. is from the MN. If the authentication data is invalid, the HA may discard the BRA message 204 without analyzing its contents. If the authentication data is valid, the HA may analyze the timestamp in the Mobility Message Replay Protection Option. Specifically, the HA may check the timestamp in the Mobility Message Replay Protection Option to make sure that the BRA message 204 has been sent within the allowed time interval. The HA may then process the BRA message 204.

Figure 3:
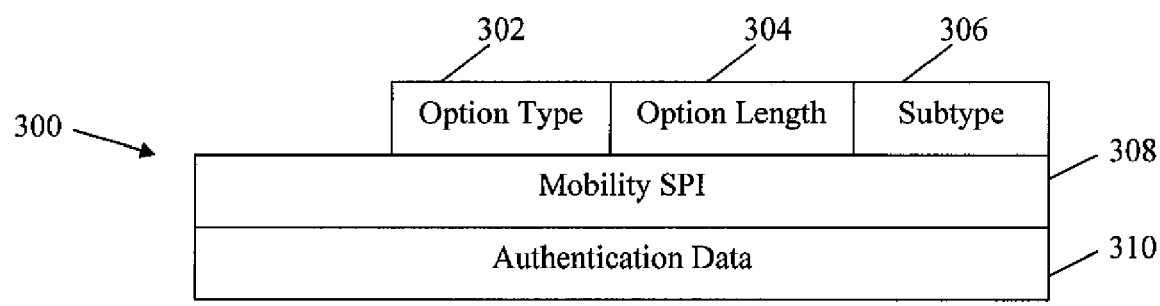
FIG. 3 a schematic diagram of an Authentication Mobility Option.

FIG. 3 illustrates an embodiment of the Authentication Mobility Option 300. The Authentication Mobility Option 300 may be used to authenticate the BRI and/or BRA messages described above using the shared-key based SA between the MN and the HA. The Authentication Mobility Option 300 may comprise an option type 302, an option length 304, a subtype 306, a mobility SPI 308, and an authentication data 310. The option type 302 may be about eight bits in length and may have a value of about nine, which distinguishes the Authentication Mobility Option 300 from other types of options. The option length 304 may be about eight bits in length and may be an unsigned integer representing the length in octets of the subtype 306, the mobility SPI 308, and the authentication data 310. The subtype 306 may be about eight bits in length and may be a number assigned to identify the entity and/or mechanism to be used to authenticate the message. For example, the subtype 306 value may be about one to indicate that the HA-MN SA is used to authenticate the message. The mobility SPI 308 may be a number about 32 bits in length having a value from about zero to about 4,294,967, 296, where the numbers from about zero to about 255 are reserved. Specifically, the SPI 308 may be used to select the authentication algorithm and/or shared key used in computing the authentication data 310.

The authentication data 310 may be a sequence calculated using the message contents from the mobility header to the mobility SPI 308. Specifically, the authentication data 310 may be the first about 96 bits of a Message Authentication Code (MAC) resulting from a Keyed-Hashing for Message Authentication (HMAC_SHA1) algorithm using a MN-HA shared key and the mobility data. The MN-HA shared key may be an arbitrary value about 16 octets in length known to the MN and HA, and may result from the binding update message exchange. The mobility data may comprise the MN's CoA, HoA, and the message contents from the mobility header to the mobility SPI 308. The Checksum field in the Mobility Header may be set to about zero to calculate the mobility data. If desired, the mobility data may comprise a replay protection mechanism, such as the Sequence number as specified in RFC 3775 or the Timestamp option as defined in RFC 4285. If the Timestamp option is used for replay protection, the mobility security association may include a "close enough" field to account for clock drift. For example, a default value greater than about three seconds may be used, such as about seven seconds.

Figure 4:
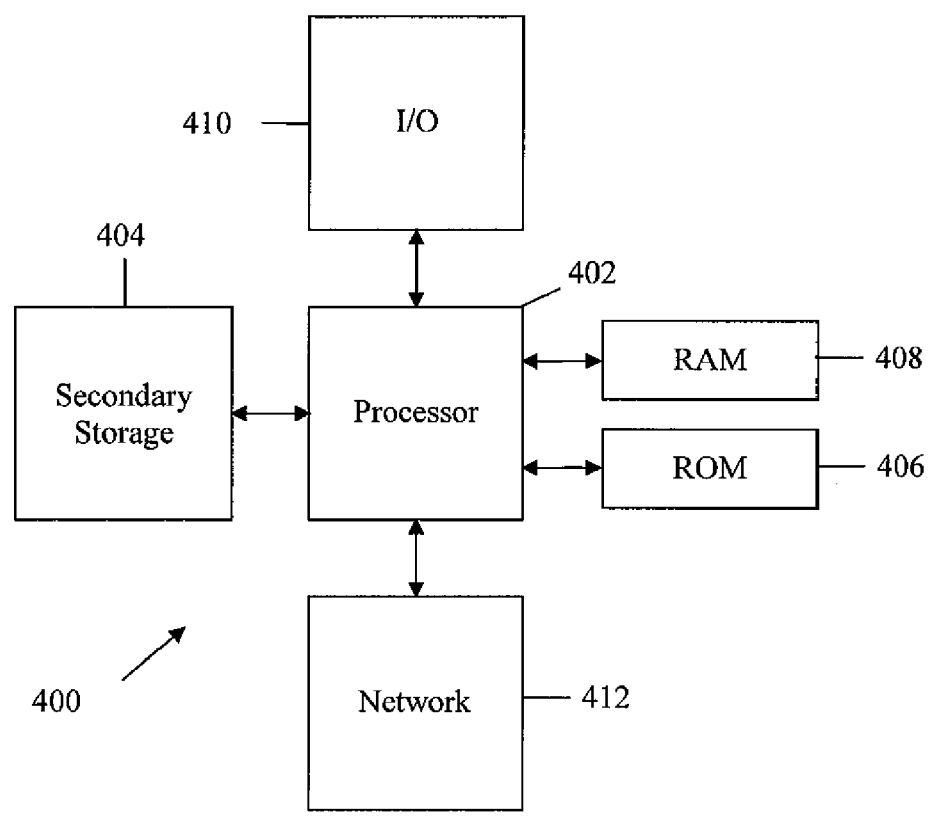
FIG. 4 is an illustration of an embodiment general-purpose computer system.

The network components described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers, as defined in the above, is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a memory;
   at least one processor configured to:
   send a binding revocation indication (BRI) message comprising a first authentication mobility option to a mobile node, wherein the message is configured to revoke a mobility binding for the mobile node, wherein the first authentication mobility option is used to authenticate the BRI message;
   receive a binding revocation acknowledgment (BRA) message comprising a second authentication mobility option from the mobile node, wherein the second authentication mobility option comprises an authentication data, wherein the second authentication mobility option is used to a authenticate the BRA message.

2. The network component of claim 1, wherein the first authentication mobility option and the second authentication mobility option are based on a shared key between the mobile node and the network component.

3. The network component of claim 1, wherein the BRA message comprises a binding revocation success indication.

4. The network component of claim 1, wherein the BRA message comprises a status code that indicates authentication failure when the authentication mobility option in the message is invalid.

5. The network component of claim 1, wherein the processor is further configured to:
   analyze the second authentication mobility option in the BRA message based on the authentication data; and
   discard the BRA message when the second authentication mobility option is invalid.

6. A system comprising:
   a memory;
   at least one processor;
   a home agent configured to send a binding revocation indication (BRI) message to a mobile node and receive a binding revocation acknowledgement (BRA) message from the mobile node,
   wherein the BRI message comprises a first authentication mobility option and the BRA message comprises a second authentication mobility option, and
   wherein the first authentication mobility option comprises a mobility security parameter index (SPI) and an authentication data.

7. The system of claim 6, wherein the authentication data is the first 96 bits of a message authentication code, and wherein the first authentication mobility option is based on a shared key between the mobile node and the home agent.

8. The system of claim 6, wherein the BRI message, the BRA message, or both comprise a mobility message replay option.

9. A method comprising:
   receiving a binding revocation indication (BRI) message comprising an authentication mobility option from a home agent;
   analyzing the authentication mobility option; and
   sending a binding revocation acknowledgement (BRA) message to the home agent,
   wherein the authentication mobility option comprises a mobility security parameter index (SPI) and an authentication data.

10. The method of claim 9, wherein the authentication data is the first 96 hits of a message authentication code.

11. The method of claim 9, wherein the authentication mobility option further comprises an option type field, an option length field, and an option subtype field,
   wherein the option type field comprises a unique value that distinguishes the authentication mobility option from other types of options,
   wherein the option length field comprises an unsigned integer that represents the length in octets of the subtype field, the mobility SPI, and the authentication data,
   wherein the option subtype field identifies an authentication mechanism, and
   wherein analyzing the authentication mobility option comprises determining whether the authentication data is valid according to the authentication mechanism.

12. The method of claim 9, wherein the authentication mobility option is based on a shared key between a mobile node and the home agent.

13. The network component of claim 5, wherein the second authentication mobility option further comprises an option subtype field that identifies an authentication mechanism, and wherein analyzing the second authentication mobility option comprises determining whether the authentication data is valid according to the authentication mechanism.

14. The network component of claim 1, wherein the first authentication mobility option and the second authentication mobility option prevent the revocation of the mobile node's mobility binding by unauthorized third parties.

15. The system of claim 6, wherein the first authentication mobility option further comprises an option subtype field that identifies an authentication mechanism, and wherein the mobile node is configured to analyze the first authentication mobility option according to the authentication mechanism.

16. The system of claim 6, wherein the first authentication mobility option prevents an unauthorized party from revoking the mobile node's mobility binding.

17. The method of claim 11, wherein the BRA message comprises a status code that indicates authentication failure if the authentication data is invalid.

18. The method of claim 9, wherein the authentication mobility option prevents an unauthorized party from revoking the mobile node's mobility binding.

19. The method of claim 9 further comprising deleting a binding update list identified in the BRI when the authentication data is valid.

20. The system of claim 6, wherein the SPI identifies an authentication algorithm and a shared key, and wherein analyzing the first authentication mobility option according to the authentication mechanism comprises:
    computing a Message Authentication Code (MAC) by applying the authentication algorithm to the shared key; and
    comparing the authentication data to at least a portion of the MAC to determine if the authentication data is valid.

21. The network component of claim 2, wherein the shared key is a result of a binding update message exchange.

22. The network component of claim 21, wherein the first authentication mobility option comprises a mobility security parameter index (SPD), and wherein the authentication data is based on message contents from a mobility header to the mobility SPI.

* * * * *

UNITED STATES PATENT AND TRADEMARK OFFICE
CERTIFICATE OF CORRECTION

PATENT NO.      : 8,370,503 B2
APPLICATION NO. : 12/397163
DATED           : February 5, 2013
INVENTOR(S)     : Yangson Xia It is certified that error appears in the above-identified patent and that said Letters Patent is hereby corrected as shown below:

Column 7 Line 36 - Claim 1 should read:

1. A network component comprising:
a memory;
at least one processor configured to:
send a binding revocation indication (BRI) message comprising a first authentication mobility option to a mobile node, wherein the message is configured to revoke a mobility binding for the mobile node, wherein the first authentication mobility option is used to authenticate the BRI message;
receiving a binding revocation acknowledgement (BRA) message comprising a second authentication mobility option from the mobile node, wherein the second authentication mobility option comprises an authentication data, wherein the second authentication mobility option is used to authenticate the BRA message.

Column 10 Line 10 - Claim 22 should read:

22. The network component of claim 21, wherein the first authentication mobility option comprises a mobility security parameter index (SPI), and wherein the authentication data is based on message contents from a mobility header to the mobility SPI.

Signed and Sealed this
Second Day of April, 2013

Teresa Stanek Rea
*Acting Director of the United States Patent and Trademark Office*